April 8, 1924.

D. O. GREEN

CAR ROOF

Filed Jan. 17, 1919  6 Sheets-Sheet 1

WITNESS:

INVENTOR.
Daniel O. Green

April 8, 1924.
D. O. GREEN
CAR ROOF
Filed Jan. 17, 1919   6 Sheets-Sheet 2
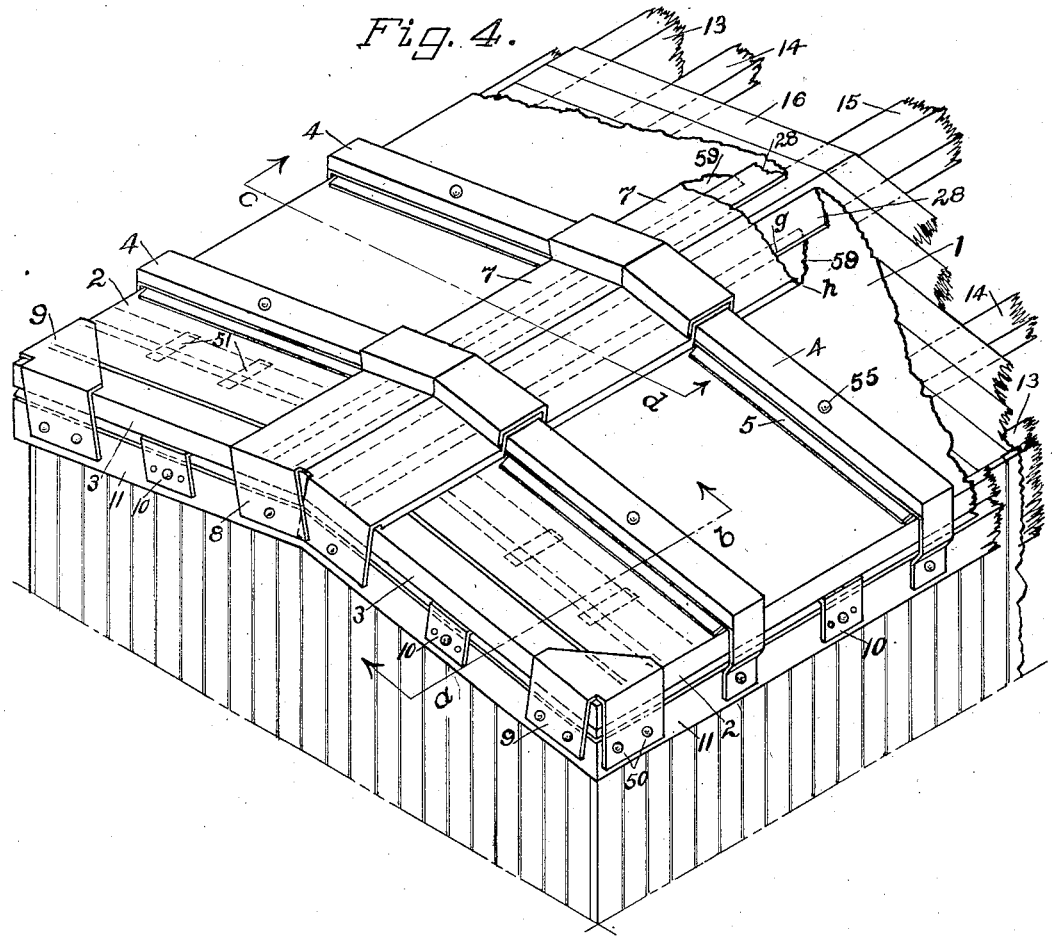
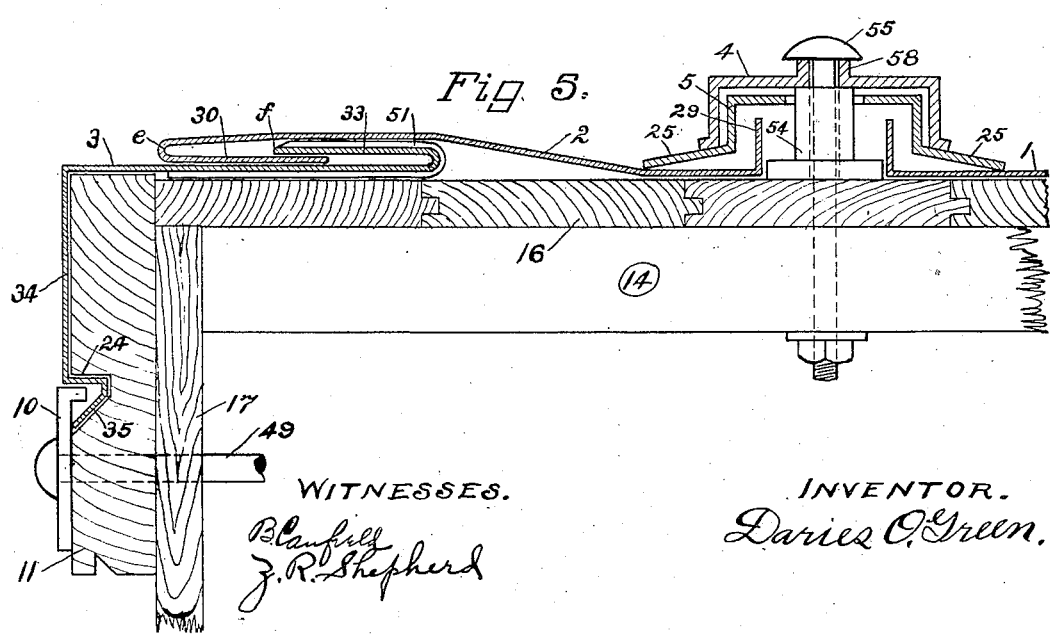
WITNESSES.
B. Canfield
J. R. Shepherd
INVENTOR.
Daries O. Green.

April 8, 1924.                                      1,489,637
D. O. GREEN
CAR ROOF
Filed Jan. 17, 1919      6 Sheets-Sheet 3
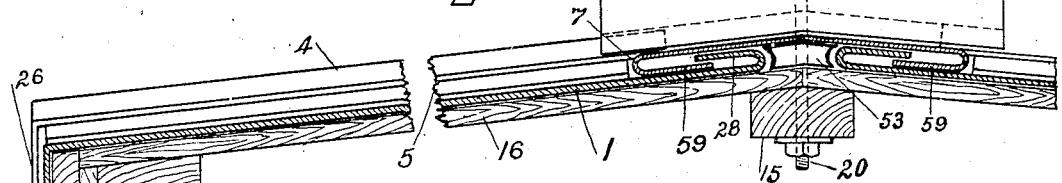
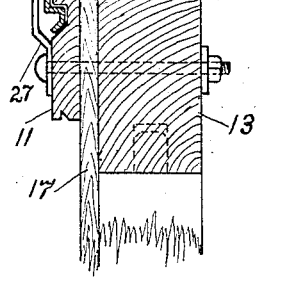
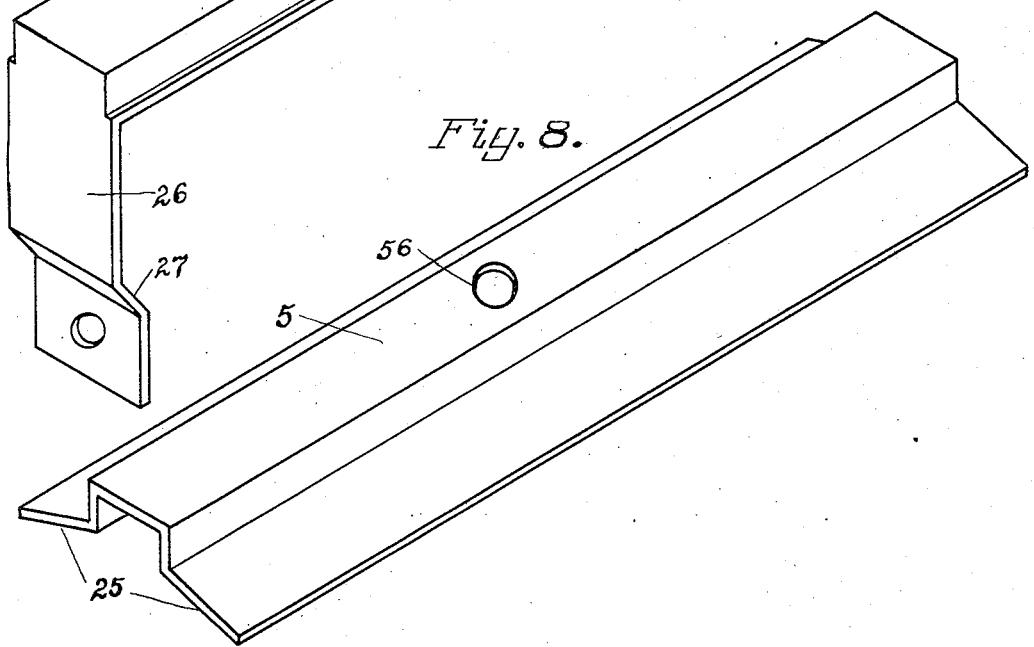
WITNESSES.                               INVENTOR.
B. Canfield                              Daniel O. Green.
J. R. Shepherd April 8, 1924.
D. O. GREEN
CAR ROOF
Filed Jan. 17, 1919   6 Sheets-Sheet 4
1,489,637
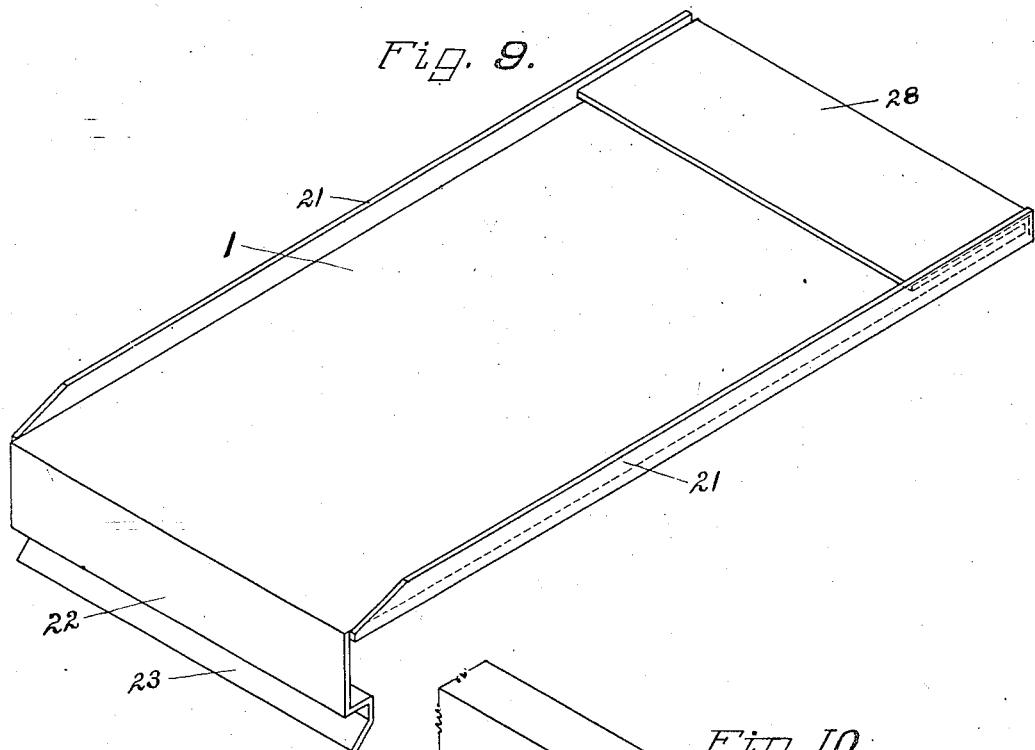
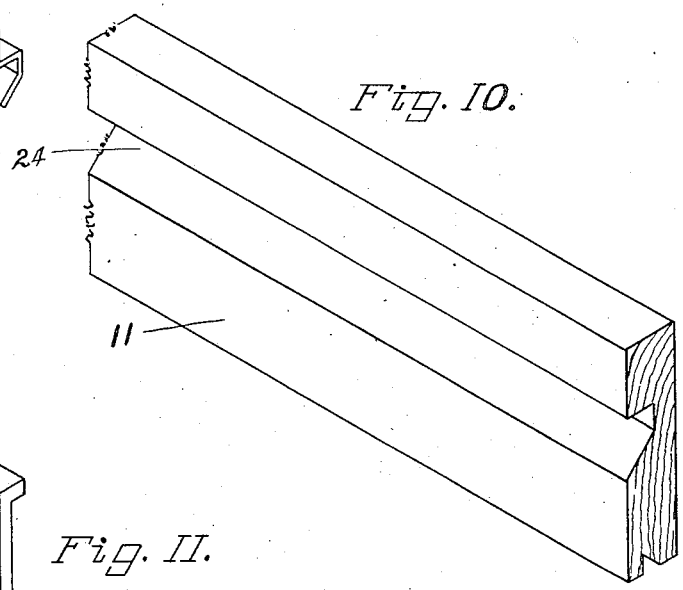
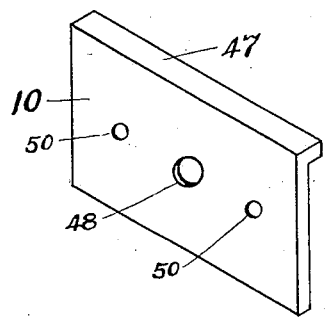
WITNESSES.
INVENTOR.
Davies O. Green.

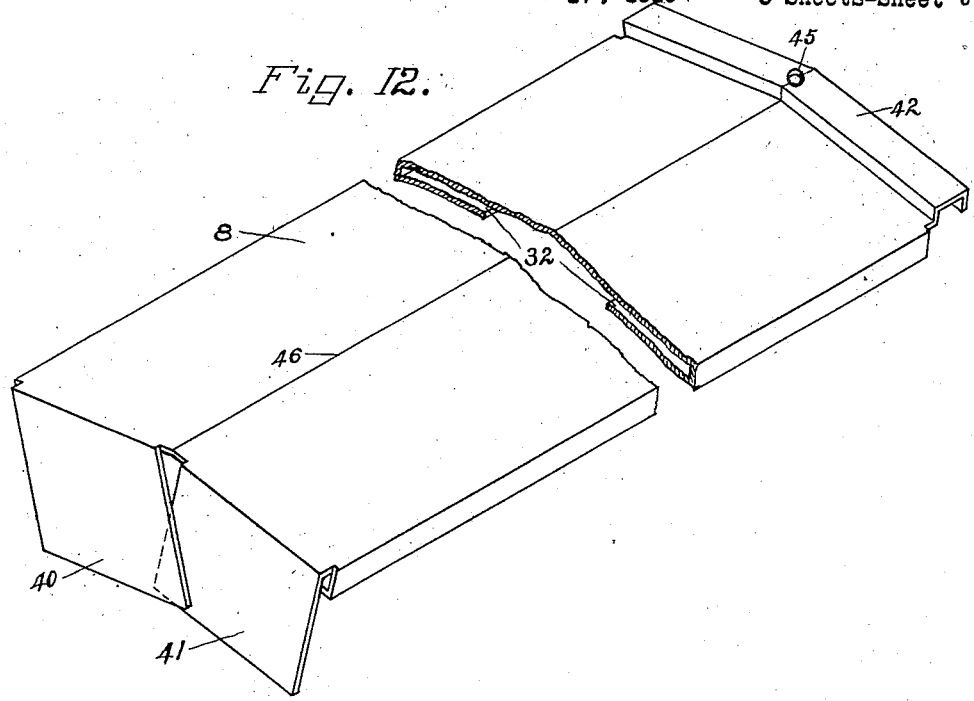
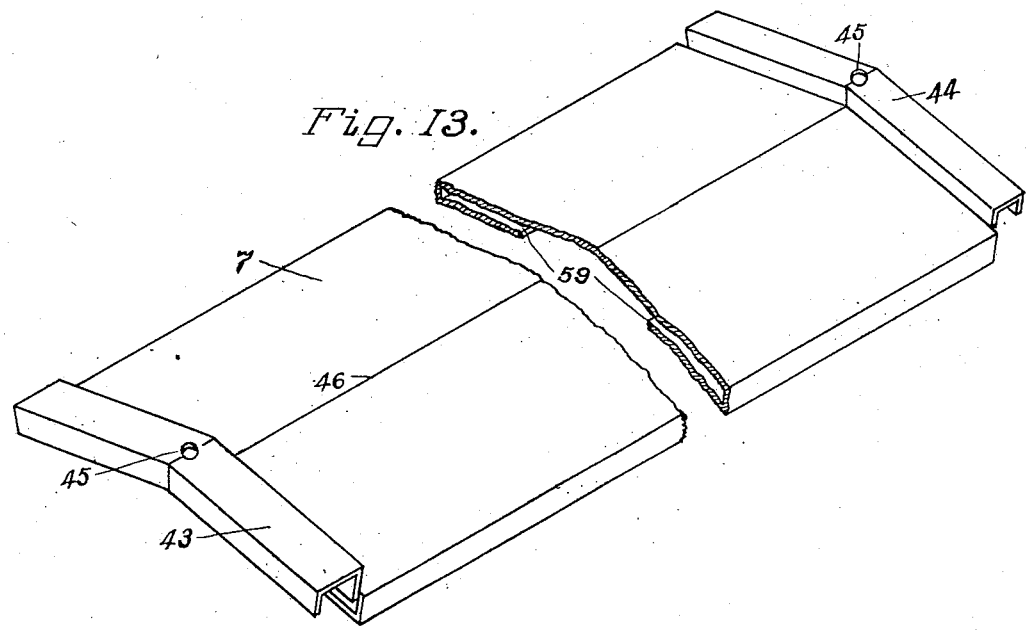

April 8, 1924.

D. O. GREEN

CAR ROOF

Filed Jan. 17, 1919      6 Sheets-Sheet 6

1,489,637

WITNESSES.
B. Caufield
J. R. Shepherd

INVENTOR.
Daries O. Green.

Patented Apr. 8, 1924.

1,489,637

UNITED STATES PATENT OFFICE.

DARIES ORION GREEN, OF BICKNELL, INDIANA.

CAR ROOF.

Application filed January 17, 1919. Serial No. 271,575.

*To all whom it may concern:*

Be it known that I, DARIES ORION GREEN, a citizen of the United States of America, residing in Bicknell, in the county of Knox and State of Indiana, have invented a new and useful Car Roof, of which the following is a specification.

This invention relates to certain improvements in car roofs and has relation more particularly to a roof of this general character especially designed and adapted for use in connection with railway cars and of the type generally known as outside metal roofs, and an object of the invention is to provide a novel and improved roof wherein the attachment of the parts to the substructure will not cause the same to be split or broken by the vibrations or deflections thereof.

It is also an object of the invention to provide a novel and improved roof of this general character wherein the various parts comprised therein can be produced by machine from sheet metal and whereby said parts can be readily repaired and straightened or restored to the proper form with tools ordinarily used in general car repairing.

Another object of the invention is to provide a novel and improved roof which includes parts which may be readily adjusted to the various sizes of cars so that cutting and fitting of the parts will not be necessary in applying the same.

A still further object of the invention is to provide a novel and improved roof wherein metal of any desired thickness can be employed in making the several parts.

The invention consists in the details of construction and in the combination and arrangement of the several parts of my improved car roof whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 4 is a perspective view of a portion of a car with roof applied;

Figure 5 is a fragmentary sectional view taken on line *a—b* Figure 4;

Figure 6 is a fragmentary sectional view taken on line *c—d* Figure 4, with the addition of the running boards and saddle shown in place;

Figure 7 is a perspective view of a seam cap;

Figure 8 is a perspective view of a seam subcap;

Figure 9 is a perspective view of a main roof sheet;

Figure 10 is a perspective view of a portion of the fascia board;

Figure 11 is a perspective view of a flashing guard;

Figure 12 is a perspective view of an end ridge seam cap with a portion broken away showing the wide underturned flange;

Figure 13 is a perspective view of a ridge seam cap with a portion broken away showing the wide underturned flange;

Figure 1:
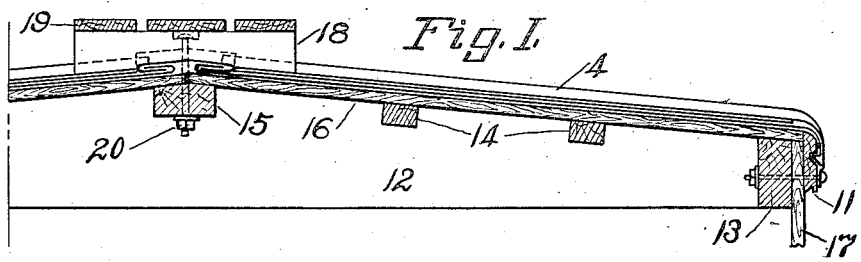
Figure 1 is a fragmentary sectional view taken through a portion of a roof constructed in accordance with an embodiment of my invention with the running-board in position.
Figure 2:
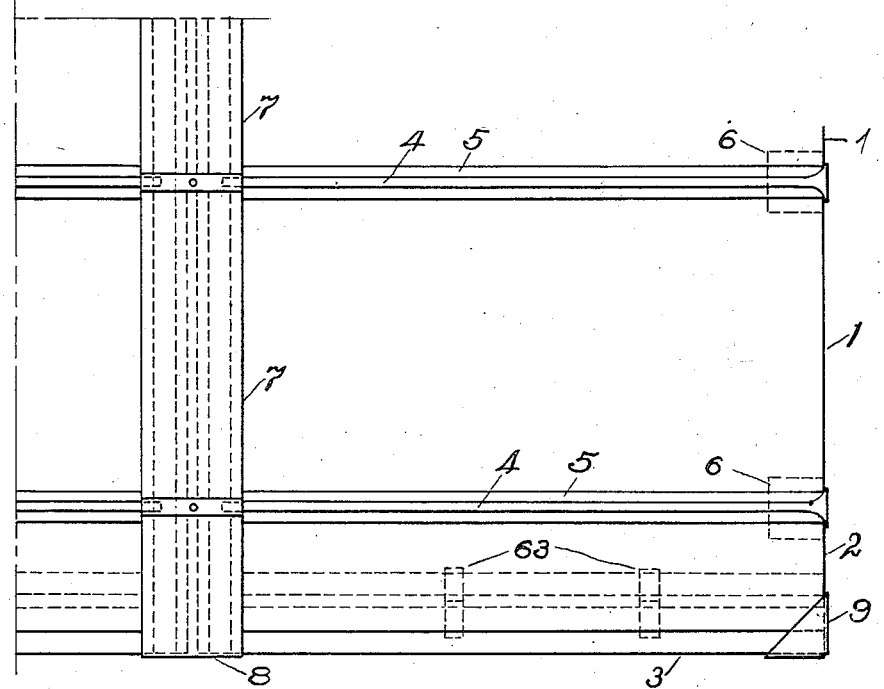
Figure 2 is a view in top plan of the structure illustrated in Figure 1 with the running-board omitted.

As disclosed in the accompanying drawings, my improved roof comprises the main sheets 1 disposed transversely of the roof decking 16 and extending in opposite directions from the ridge pole 15. The upper end portion of each of the sheets 1 is return bent to form a wide overturned flange, as illustrated at 28 in Figures 4, 6 and 9 to interlock with the underturned flange 59 of the seam cap 7 and thus provide a means for expanding or contracting the roof for various widths of cars.

As is particularly illustrated in Figure 9, each of the main sheets 1 is produced from a blank sheet of material having the corners at the upper or inner end cut away at right angles, and the opposite corners cut away on obtuse angles. The side portions 21 of the sheet are turned up at right angles to the plane of the sheet with one end of each of said upstanding side portions arranged at right angles to the sheet proper and the opposite ends sloping down to the plane of the sheet.

The upper or inner end portion of the sheet 1 is turned over in parallelism with the plane of the sheet, as indicated at 28 in Figures 4, 6 and 9, forming a wide flange coacting with the wide flange 59 of the ridge seam cap. The opposite end portion of the sheet 1 is turned down forming a depending end, which covers a portion of the fascia board 11.

The depending portion 22 of the sheet 1 is provided with a rebent flange 23, Figure 9, which fits into a groove 24 disposed longitudinally of the fascia board 11, Figures 5 and 10. The flange 23 is formed at right angles to the depending portion of the sheet 1 with the rebent portion of the flange depending downward and outward at an angle of 45 degrees and terminating on a line parallel with the inner plane of the depending end of the sheet. When applied to a car, flange 23 is held in the groove 24 by guards 10, Figure 11, also Figures 3, 4 and 5. By means of the fascia board 11 and guards 10 the sheets 1 are loosely held in place.

When applied to the decking 16, the upstanding side portions or flanges 21 are closely related, and disposed over each pair of adjacent portions or flanges 21 is a subseam cap 5. The subseam cap 5, Fig. 5, shown in perspective in Figure 8, is formed from a plane sheet of metal bent to a U-shape in cross section with the free marginal portions 25 of the sides turned out approximately 60 degrees forming flanges. The purpose of the flanges 25 are to be compressed on the surface of the main sheets 1 to make a flexible, dust-proof and waterproof joint.

After the subseam cap 5 has been applied, the seam cap 4 is fitted thereover, as illustrated in Figures 4 and 5. The seam cap 4 is formed from sheet metal, preferably heavier than the sheets 1 and the subseam cap 5. The major portion of the cap 4 is substantially U-shaped in cross section and the side flanges thereof snugly engage the sides of the subseam cap 5 above the portions 25 thereof.

The outer end of the cap 4, Figs. 6 and 7, is continued by a depending end plate 26 and has its outer end portion bolted to the fascia board 11 and to the side plate 13. The depending end or plate 26 covers the joint between the adjacent sheets 1 and its upper portion is outwardly offset as at 27, Figs. 6 and 7, so that when said end or plate 26 is bolted to the fascia board, the sheets 1 will be held loosely in place.

The inner end portion of cap 4, Figure 7, extends up and under the saddle 18 which is grooved to fit over the cap and held in place by bolt 20.

2 denotes an end sheet and, as is particularly illustrated in Figures 4, 5 and 6, said end sheet is formed from a rectangular blank of material having three of its corners cut away at right angles and one corner cut away on an obtuse angle. A longitudinal marginal portion is turned up at right angles to the sheet to afford a flange 29 with one end at right angles to the sheet and the opposite end sloping to the plane of the sheet corresponding to the flange 21 of a sheet 1.

The opposite longitudinal marginal portion of the blank for the end sheet 2 is turned under to produce a flange 30 parallel with the plane of the sheet. One end of the blank is turned over to parallel with the plane of the sheet to produce the wide flange 31 which when assembled engages with the wide flange 32 of the end ridge cap 8. The opposite end of the blank is turned down to form a depending end or plate 39 which covers a portion of the fascia board 11 to make a flashing. The depending end or flashing 39 has a rebent flange 38 turned inwardly and under the sheet at right angles with the plane of the flashing thence downward and outward at about 45 degrees terminating on a line parallel with the inner plane of the flashing to conform with the flange 23, sheet 1.

Figure 15:
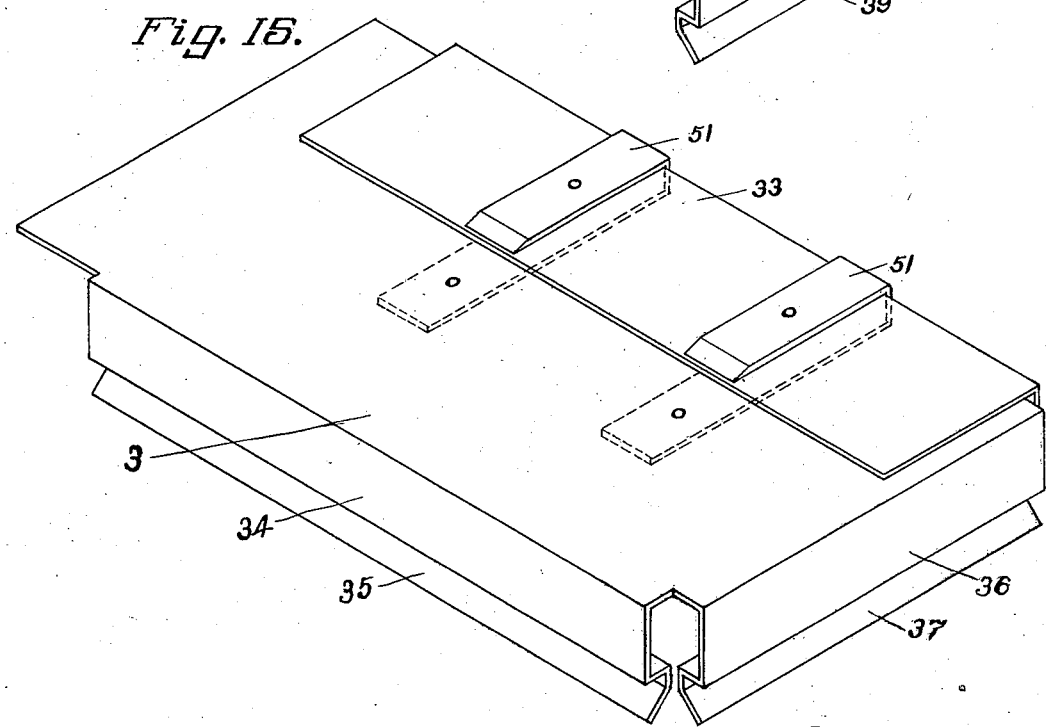
Figure 15 is a perspective view of an end flashing sheet.

An end sheet 2 is laid at each corner with the flange 30 engaging the flange 33 of an end flashing sheet 3. The end flashing sheet 3 is particularly illustrated in Figure 15 and is shown assembled in Figures 2, 3, 4 and 5. As can be seen by Figure 15, the end flashing sheet is formed from a rectangular blank sheet of material having the four corners cut away at right angles. A longitudinal marginal portion of the blank is turned over parallel with the plane of the sheet to produce the flange 33 which interlocks with the flange 30 of an end sheet 2 to form an expansion joint. The expansion joint provides a means by which the roof can be adjusted to different length of cars. By referring to Figure 5 it can be seen that the end flashing sheet 3 can be located anywhere between the points e—f. Taking one foot as the distance between the points e—f there is a range of one foot plus one foot at the opposite end of the roof making a total of two feet, the longitudinal range of adjustment of the roof. Thereby the roof can be applied to a car thirty feet long or a car thirty-two feet long or a car of any length between thirty and thirty-two feet.

The opposite longitudinal marginal portion of the blank for sheet 3 is turned down forming a depending side or plate 34 which covers a portion of the fascia board 11 and forms a flashing. The plate 34 has a rebent flange 35 to conform to the rebent flange 23 of sheet 1. The outer end portion of the blank for sheet 3 is also turned down to form a flashing 36 which has a rebent flange 37 which conforms with the rebent flange 23 of sheet 1. The inner or upper end portion of the blank for sheet 3 is left flat and when assembled extends up and under the end ridge seam cap 8.

Co-acting with the flanges 23, 35, 37 and 38, of sheets 1, 2 and 3, are the guards 10 which hold the sheets loosely in their relative position to the substructure.

Coacting with the ridge ends of the sheets 2 and 3 is the end ridge seam cap 8 and which end ridge seam cap is of substantially the same construction as the main ridge seam cap 7 illustrated in Figure 13 with the exception that one end of the end ridge cap 8 is divided at substantially its transverse center, the divided portions being turned down forming plates 40 and 41, Figure 12, which overlie a portion of the fascia board 11 and are bolted or otherwise fastened thereto. The end ridge cap also has wide underturned flanges 32 which intersect with the wide overturned flanges 31 of the end sheet 2 to form an expansion joint. The opposite end of the end ridge cap 8 has a channel 42, formed to coact with a channel 43 of a ridge cap 7.

The main ridge seam cap 7, as is illustrated in Figure 13, is formed from a rectangular sheet of material having the four corners cut away at right angles, and the longitudinal side portions folded under to parallel with the place of the sheet to form the wide flanges 59, which co-act with the wide flanges 28 of a main sheet 1 to produce an expansion joint as shown at 59 and 28, Figure 4. The distance between the points $g$—$h$, Figure 4, is assumed to be six inches. Therefore the sheet 1 can be moved outwardly a distance of six inches and the sheet 1 directly opposed on the opposite side of the car likewise can be moved outward a distance of six inches making a total of twelve inches or one foot as the range of adjustment that the roof can be transversely adjusted. By means of the expansion joints thus provided the roof can be applied to a car eight feet wide or a car nine feet wide or a car of any width between eight and nine feet.

The marginal end portions of the main ridge seam cap 7 are each formed into a channel shape as shown at 43 and 44, Figure 13. The channel at one end of the cap is larger than the channel at the opposite end and when assembled the larger channel of a seam cap fits over the smaller channel of the adjoining seam cap. The seam caps are held in place by a running board saddle bolt 20 which is placed through the openings 45, Figures 12 and 13, and shown assembled in Figure 6. The main ridge seam cap 7 and the end ridge seam cap 8 are each bent longitudinally on the line 46 to conform to the pitch of the roof.

Figure 3:
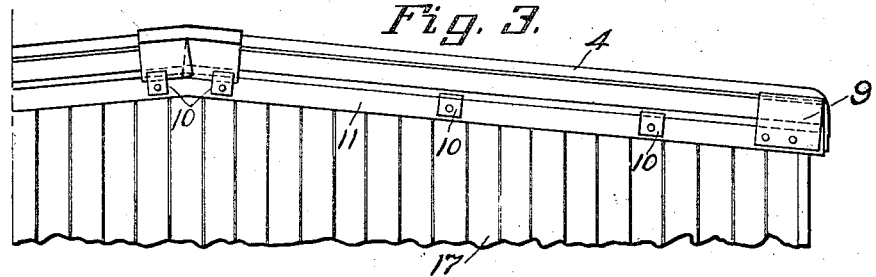
Figure 3 is an end elevation of the structure as particularly illustrated in Figure 2, the running-board being also omitted.
Figure 14:
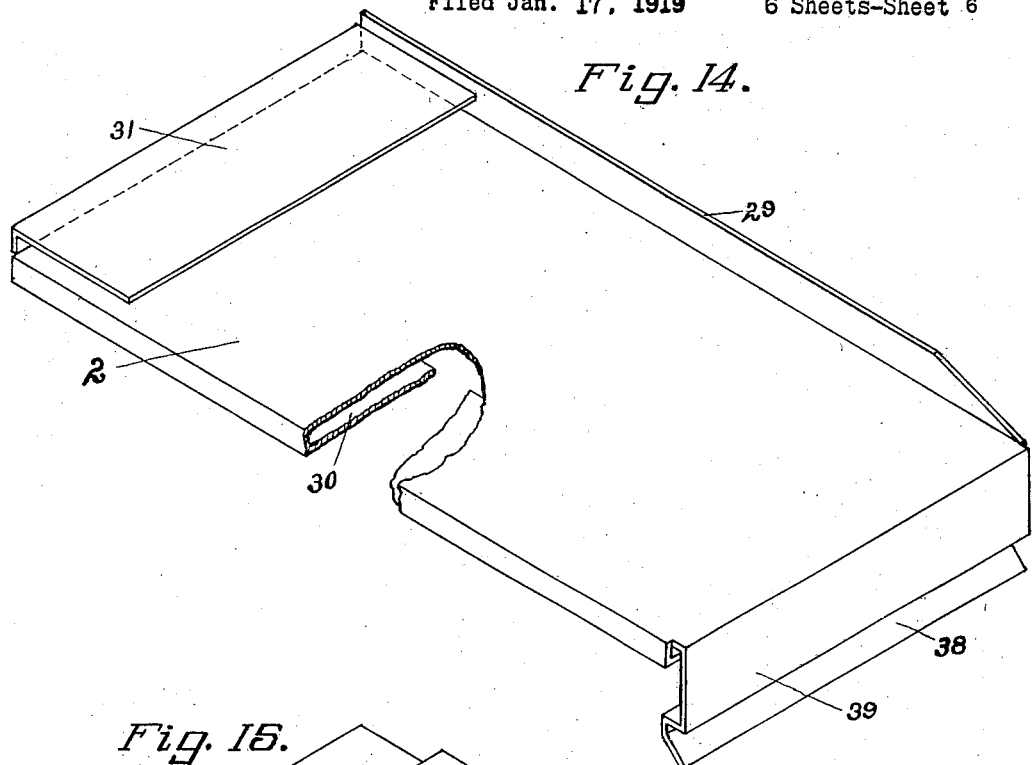
Figure 14 is a perspective view of an end sheet with a portion broken away to show the wide underturned flange.

The end portions of the sheets 1, 2 and 3 overlying the fascia board 11 are held in their respective positions by guards 10. The guards 10 shown in Figure 11, and assembled in Figures 3, 4 and 5, are formed from a flat sheet of material having one marginal edge bent to right angles to the sheet forming a flange 47. The guard is provided with an opening 48 for the passing of the bolt 49, Figure 5, and openings 50 are provided for the passage of nails or other like means of fastening. When assembled, the guard 10 is secured to the fascia board 11 by means of the bolt 49, Figure 5, with the flange 47 engaged within the rebent flange 35 of the flashing plate whereby the guard 10, together with the fascia board 11 hold the sheets in their proper position to the substructure without clamping them to the fascia board. This is made possible by the peculiar shape of the groove 24 in the fascia board 11 and the flange 35.

Co-acting with each corner of the roof is the corner cap 9, Figure 4. The cap 9 is formed from a rectangular blank sheet of material having one corner cut away on a diagonal line near to the next adjacent marginal corners. The diagonally opposed corner is cut away at right angles. The two remaining marginal portions of the sheets are then turned down to approximately right angles to the plane of the sheet forming a three sided cup or cap. The two depending sides of the cap overlie a portion of the fascia board 11 and are provided with openings for passing of bolts by which they are secured to the fascia board. It can be seen that the free depending sides of the cap 9 make it adjustable to the pitch of the roof.

Co-acting with the flange 33 of the end flashing sheet 3, Figures 5 and 15, are the clips 51 preferably made of a heavier material than the sheet 3. The clips 51 are made secure to the flange 33 and reinforce it against the action of the flange 30 of sheet 2.

The saddles 18 are of a well known type and support the running boards 19. As hereinbefore stated, each of the saddles 18 is secured to the ridge pole 15 by the bolts 20. Each of the bolts 20 has its head seated within a recess or pocket in the upper face of the co-acting saddle 18 and disposed over said recess or pocket is a saddle bolt flashing 52 which may be of any suitable type. The saddle 18 is grooved on the under face to fit over the channels 43 of the ridge seam cap 7 and the ends of the seam cap 4.

The saddle support 53, Figure 6, provides a means of supporting a running board saddle to prevent the saddle clamping the roof sheet 1 when said saddle is drawn down by the bolt 20. This means comprises a saddle support preferably of cast iron made to conform to the pitch of the roof with the sides thereof concave in cross section and provided at substantially its center with an opening for the passage of the bolt 20. The support 53 is placed over the decking 16 and ridge pole 15 and under the seam cap 7.

Co-acting with the seam cap 4, Figure 5, is the sleeve 54. The sleeve 54 is preferably cylindrical in shape and having a flange on one end to prevent it being imbedded into the decking 16. It is of the proper length to extend from the decking to the underside of the seam cap 4, and is provided with an opening through the center for passing the bolt 55. The subseam cap 5 has an opening 56, Figure 8, which is large enough to allow the sleeve 54 to pass through and allow free movement of the subseam cap. The seam cap 4 has an opening 57, Figure 7, which opening has an upstanding flange 58 against which the head of the bolt 55 is seated. The sleeve 54 is placed on the decking 16 between the flanges 29 of the roof sheets and the subseam cap 5 is placed over the sleeve and flanges of the roof sheets. The seam cap 4 is placed over the subseam cap 5 and the bolt 55 inserted through the opening provided therefor drawing the seam cap 4 down on the flanges 25 of the subseam cap 5. The sleeve 54 receives the tension of the bolt 55 between the decking 16 and the seam cap 4 and holds the seam cap rigidly in place without clamping the roof sheets 1 and 2 to the decking 16 so that the said sheets are free to adjust themselves to the different positions caused by the vibrations of the roof structure. The subseam cap 5 is also free of any rigid fastening and is always in contact with the roof sheets either by tension of the seam cap 4 on the flanges 25 or by gravity.

From the foregoing description, it is thought to be obvious that a car roof constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

It will also be obvious from the foregoing description that all of the parts comprised in my improved roof can be made or formed by stamping or pressing metal sheets of any thickness desired in specially designed dies and machines and that my improved roof can be secured to the substructure in a way that will permit of deflection and vibration without buckling or straining the roof sheets. It is also to be noted that the seam caps are bolted to the substructure in a manner to retain the roof or main sheets in their proper alinement and compressing the flexible subseam cap of the main sheets 1 to provide constant water- and dust-proof joints.

I claim:

1. A car roof comprising, in combination with a substructure, sheets resting on the substructure and arranged side by side, the side marginal portions of the sheets being provided with upstanding flanges, a substantially U-shaped subseam cap straddling adjacent flanges of the sheets, said cap being provided with resilient flanges contacting with the sheets, a seam cap straddling the subseam cap and engaging the resilient flanges of the subseam cap, and means disposed through the caps and engaged with the substructure for holding the caps applied, said means also serving to force the seam cap against the flanges of the subseam cap to compress the same on the joints.

2. A car roof comprising, in combination with a substructure, sheets resting on the substructure and arranged side by side, the side marginal portions of the sheets being provided with upstanding flanges, a substantially U-shaped subseam cap straddling adjacent flanges of the sheets, said cap being provided with resilient flanges contacting with the sheets, a seam cap straddling the subseam cap and engaging the resilient flanges of the subseam cap, a bolt disposed through the seam cap and the subseam cap and engaged with the substructure, and a sleeve surrounding the bolt and interposed between the substructure and the seam cap, the subseam cap being provided with an opening through which the sleeve extends for contact with the seam cap.

3. A car roof comprising, in combination with a substructure, sheets arranged side by side on each side of the ridge of the substructure, the sheets at each side of the ridge being capable of limited movement one relative to the other, a cap member connecting the ridge ends of the sheets, an end sheet and an end flashing sheet resting on the substructure, one side marginal portion of said end sheet being provided with upstanding flanges of the first named sheet, the opposite side marginal portion of the end sheet being provided with a wide overturned flange, said flange being reinforced with certain members constituting clips coacting therewith, one side and end marginal portion of said end flashing sheet having downturned flanges overlying the fascia board, and the opposite side marginal portion of said end flashing sheet being provided with a wide underturned flange coacting with an overturned flange of the end sheet to provide an expansion joint.

4. A car roof comprising, in combination with a substructure including a decking and a fascia board, sheets loosely mounted on the decking side by side and having flanges overlying the fascia board, seam caps coacting with the adjacent side margins of the sheets, an end sheet and an end flashing sheet coacting to form an expansion joint, a cap member overlying the outer ends of said end sheet and end flashing sheet, said cap member having two adjacent sides turned down and secured to the fascia board and coacting with said end sheet and end flashing sheet to maintain said sheets in proper positions relative to the substructure.

5. A car roof comprising, in combination with a substructure including a decking and a fascia board, sheets loosely mounted on the decking side by side and having wide overturned flanges at their ridge ends, ridge seam caps having wide underturned flanges coacting with the wide overturned flanges of said sheets, and supporting members interposed between the decking and said seam caps and coacting with said seam caps to maintain said caps in proper positions relative to the sheets.

Signed, this the 14 day of Jan., 1919, at Bicknell, Indiana, U. S. A.

DARIES ORION GREEN.

Witnesses:
E. T. Cox,
AGNES COX.